United States Patent [19]
Planke et al.

[11] Patent Number: 4,859,862
[45] Date of Patent: Aug. 22, 1989

[54] APPARATUS FOR GENERATING DETECTING AND CHARACTERIZING A RASTER IMAGE OF AN OBJECT

[75] Inventors: Tore Planke, Nykirke; Andreas Nordbryhn, Oslo; Steinar Solnördal, Åros, all of Norway

[73] Assignee: A/S Tomra Systems, Asker, Norway

[21] Appl. No.: 157,047

[22] Filed: Feb. 16, 1988

[30] Foreign Application Priority Data

Feb. 20, 1987 [NO] Norway ................................ 870681

[51] Int. Cl.⁴ ........................................... G01N 21/86
[52] U.S. Cl. ..................................... 250/560; 356/387
[58] Field of Search ................ 250/560, 561; 356/376, 356/381, 384–387

[56] References Cited

U.S. PATENT DOCUMENTS

3,744,915  7/1973  Sick ...................................... 356/386
4,025,796  5/1977  Erdmann ............................. 250/560
4,402,609  9/1983  Fetzer et al. ......................... 356/387

Primary Examiner—David C. Nelms
Assistant Examiner—Stephone B. Allen
Attorney, Agent, or Firm—Darby & Darby

[57] ABSTRACT

A device for generating, detecting, and characterizing a raster image of the contour of an object, wherein a narrow concentrated light beam (1) is emitted towards a light beam deflector means (3) causing said light beam (1) to sweep repeatedly across a plane (19) through which the object is guilded, and where the light beams not screened by said object are received, and are opto-electrically transformed into electrical signals, e.g. pulse trains which are characteristic of the incremental portions of a raster image of said object, said signals being processed to yield a characteristic expression of the contour of said object. A retro-reflector (5;32) is placed in such a manner that light beams (10) not screened by said object are reflected back across said plane (19) at a second angle of scattering which is equal to or larger than said first angle of scattering, and a detector (11) receives the reflected light beams (10) and transforms them into said signals, preferably for forming a successive pulse train. When a continuous light beam is used the retro-reflector is provided with a plurality of narrow non-reflecting and mutually stripes (6) across the retro-reflector (5). When a pulsed light beam is used a nontreated retro-reflector (32) is used. The plane across which the light beam (1) sweeps may be caused to oscillate in which case a two-dimensional raster image of the contour of the object is formed.

46 Claims, 5 Drawing Sheets

APPARATUS FOR GENERATING DETECTING AND CHARACTERIZING A RASTER IMAGE OF AN OBJECT

The present invention relates to a device for generating, detecting, and characterizing a raster image of the contour of an object, wherein a narrow concentrated light beam is emitted at a first scattering angle to a light beam deflector means causing the light beam repeatedly to sweep in a plane through which the object is passed, and wherein the light beams not screened by said object are received and opto-electrically converted into electrical signals which are characteristic of the incremental portions of a raster image of the object, said signals being processed to provide a characteristic expression of the contour of the object.

A device of the kind mentioned above is known from U.S. Pat. No. 4,055,834 according to which the narrow concentrated light beam used is a laser beam, and the light beam deflector means is a rotating mirror. The light beams not screened by the object are, according to U.S. Pat. No. 4,055,834 received by a light detector column comprising a determined number of optic fibres arranged one above the other and at a mutual distance, the respective light receiving ends of which being arranged flush with said mutual distance of the light detector column, and the respective remaining light emitting ends being collected in a common optoelectric means. This known detector column is, however, expensive, and a careful adjustment of the column is necessary to ensure that the laser beam can hit each separate light receiving end of the respective optic fibres.

It is, thus an object of the present invention to improve the previously known device by a technical simplification of said device without impairing the result of detection, and to make the entire device less expensive.

According to the invention the device mentioned above is characterized by the fact that a retro-reflector is provided in such a manner that the light beams not screened by the object are reflected back in said plane, and that a detector detects the reflected light beams and converts them into said electrical signals.

Further characterizing features of the invention will appear from the following claims as well as from the following disclosure with reference to the attached drawings which are solely intended as exemplary embodiments without limiting the scope of the invention.

Figure 1:
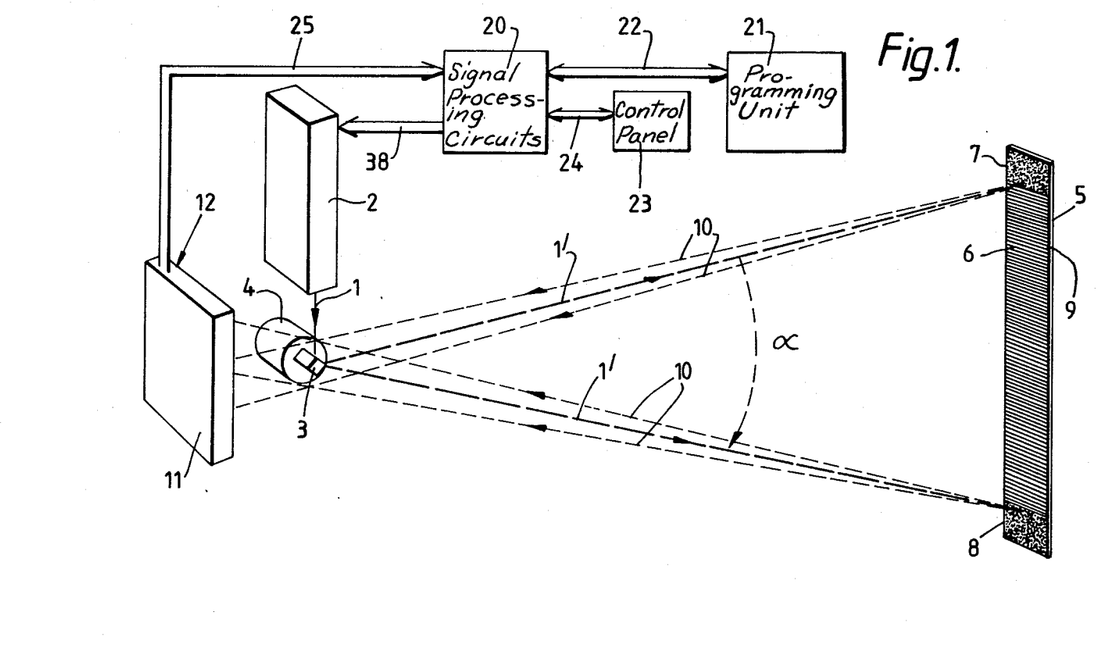
FIG. 1 shows a first embodiment of the device according to the present invention with a first kind of retro-reflector.

A narrow light beam 1 is emitted from a light source 2, which operates in a continuous modus in the embodiment shown in FIG. 1. The light source may be a laser, a light emitting diode, or another light source which is not a laser. Examples of lasers to be mentioned are a laser diode, a solid-state laser, a dye laser, a gas laser. If a laser diode, a LED, or another light source which is not a laser is used, a collimating lens must be provided in front of the light source to ensure that what is emitted from light source 2 is a narrow concentrated light beam. The light beam is caused to sweep over an angle $\alpha$ by the aid of a light deflecting means 3 which is provided with rotating mirrors. In the drawing the light deflecting means is provided with four mirror faces, but more or less mirror faces may be used as well. Light deflecting means 3 is driven by a motor 4 which has a controllable speed.

In a modification of the solution of FIG. 1 the mirror may be made to oscillate instead of rotating.

As will appear from FIG. 1 the light beam 1 is emitted from light deflecting means 3 in the shape of a narrow concentrated light beam 1' which is headed for a retro-reflector 5. The retro-reflector in FIG. 1 is in this embodiment provided with a plurality of narrow non-reflecting stripes 6 which are arranged at a mutual distance. Uppermost and lowermost the retro-reflector is provided with non-reflecting areas designated by reference numerals 7 and 8, respectively. The object of the non-reflecting areas 7 and 8 is clearly to define the beginning and the end of the active portion (stripes 9) of the retro-reflector (5).

Retro-reflector 5 may consist of a conventional reflecting material being an ordinary commodity, i.e. conventional per se, and on which said stripes 6, and non-reflecting areas 7,8 are provided. The object of the stripes 6 is to form corresponding intermediate stripes 9 which are reflecting, so that the reflected light beams 10 will arrive at an optoelectric detector 11 in an intermittent manner, since the sweeping light beam 1' is only reflected by said stripes 9. It will be understood that the device appearing from FIGS. 1–4 in the mentioned U.S. Pat. No. 4,055,834 may, in this manner, be replaced by the device disclosed above. The devices of U.S. Pat. No. 4,055,834 which are disclosed in connection with FIGS. 6a, 6b, 7, 8, 10, 11, 12 (including the output of photodiode 6 shown), and FIGS. 13 and 14 shown in said Specification could, obviously, be used in connection with the present invention for further signal processing units for the signals appearing at output 12 of the optoelectric photo-detector 11. As appears from FIG. 1 the reflected light beams 10 will hit detector 11 at a larger scattering angle than that of light beam 1' when it is emitted from light deflecting means 3. The scattering angle of light beam 10 is so large that even though light deflecting means 3 screens part of the cone of light 10 a portion of the light beam 10 will still hit detector 11. Detector 11 should have a sufficient light receiving surface to ensure that at least a portion of light beam 10 is received. In this connection we refer to FIG. 5. On detector 11 which may be of any conventional design and is, thus, only indicated diagrammatically, the light from light beam 10 which hits detector 11 is indicated by short arrows, shown in solid and dashed lines, respectively, and designated by reference numerals 13 and 13', respectively. Even though the light deflecting means 3 screens (cf. reference numerals 14,14') off part of the reflected light beam 10 a considerable portion of the reflected light beam 10 will still hit detector 11.

Figure 5:
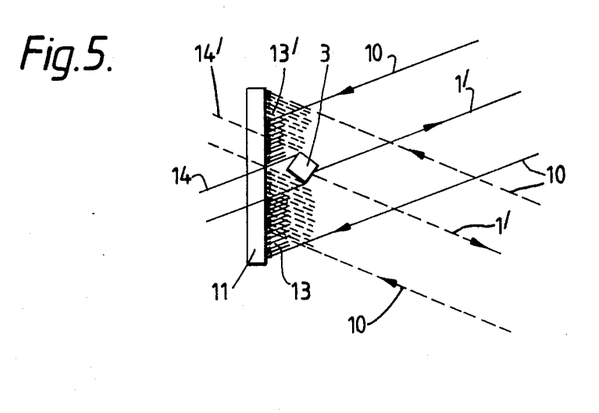
FIG. 5 illustrates light beams emitted from the light beam deflecting means, and reflected light beams arriving at a light detector means.

When detector 11 is, thus, placed at the rear of light deflecting means 3, as shown in FIGS. 1 and 5, said detector 11 will detect whether light beams 1' which are directed towards the reflecting stripes on the retro-reflector are reflected as light beams 10. The fact that light beam 10 will have a larger angle of scattering (due to natural properties of the retro-reflector) than light beam 1' which is incident on the retro-reflector is not a disadvantage of the invention, but is rather an essential feature of the invention, as a returning too narrow light beam would be screened almost completely by light deflecting means 3 in connection with the embodiment shown in FIGS. 1 and 5. It is, thus, a precondition for the embodiment of FIG. 5 that said second angle of scattering is sufficiently large.

Figure 6:
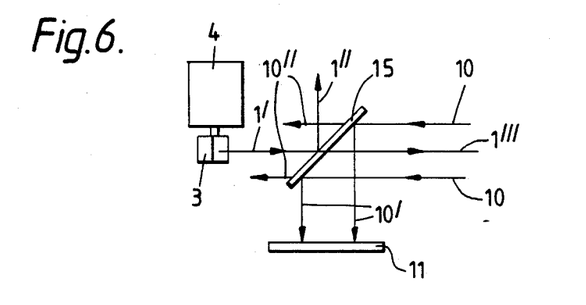
FIG. 6 shows a modification of the approach of FIG. 5.

If said second angle of scattering is not large enough, or if it is, by some other reason, not suitable to place the detector closely behind the light deflector means, a concept like that indicated in FIG. 6 may, e.g. be utilized. In this modification of the arrangement of detector and light deflector means a beam splitter 15 is placed obliquely in the path of light beam 1'. Detector 11 is arranged in such a manner that beams 10 reflected from retro-reflector are deflected, e.g. 90° towards detector 11, forming a reflected, deflected light beam 10'. Part of the reflected light beam will pass through beam splitter 15 as a light beam 10" which cannot be utilized.

Accordingly, part of the sweeping light beam 1' will be deflected, suitably at an angle of 90°, by the aid of beam splitter 15, forming a light beam 1', whereas another portion of the sweeping light beam 1' will pass through beam splitter 15 as a light beam 1'" in the direction of the retro-reflector. It will be suitable to provide beam splitter 15 equidistant from light beam deflector means and detector 11.

Figure 7:
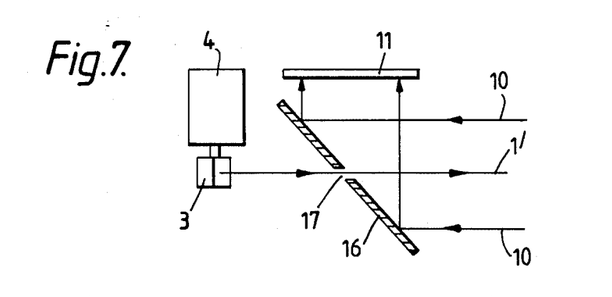
FIG. 7 shows a modification of the approach of FIG. 6.

In FIG. 7 a modification of the concept according to FIG. 6 is shown. An oblique mirror 16 is arranged and provided with a slot 17 through which the sweeping light beam 1' may pass. The light beams 10 reflected by the retro-reflector will be deflected by oblique mirror 16, preferably at an angle of 90°, towards detector 11. In this manner detector 11 may receive approximately all reflected light 10. In the concept of FIG. 7 less light intensity is demanded of light beam 1' than is the case of light beam 1' in FIG. 6.

Figure 3:
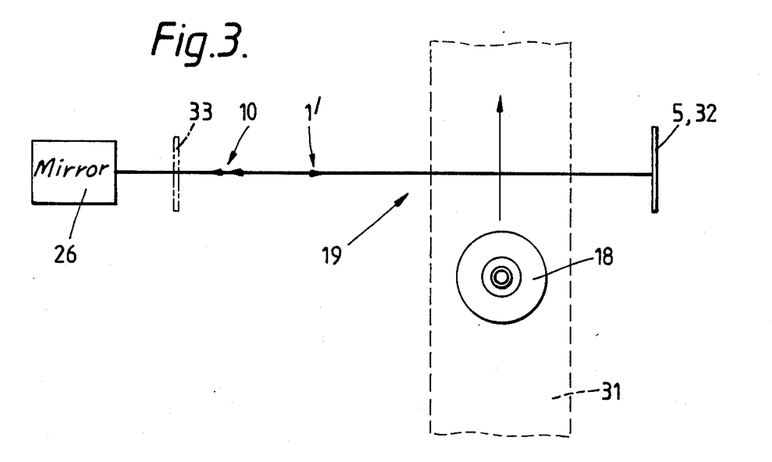
FIG. 3 is a diagrammatic plan view, and as a non-limiting embodiment, of the path of movement of an object which is to pass the device as shown in FIG. 1 (and 2).
Figure 4:
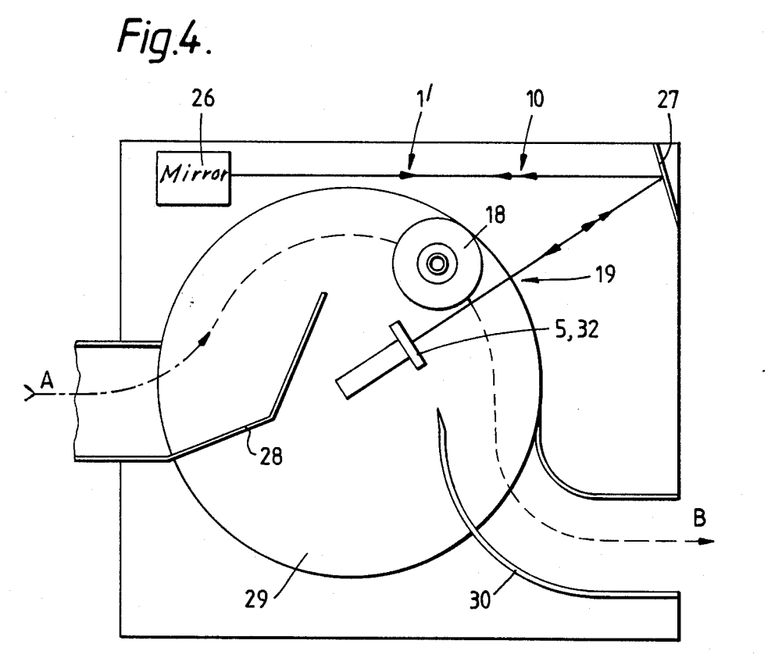
FIG. 4 shows a modification of the device in FIG. 1 (and 2) with the path of movement of an object which is to pass the device according to the invention.

Opto-electric detector 11 will on its mentioned output 12 issue repeated characteristic signals of the incremental portions of a raster image of object 18 (see FIGS. 3 and 4) passing through detection plane 19 of the device (see FIGS. 3 and 4). The characteristic signals will generally be in the shape of pulse trains with pulses occurring with the same frequency as light beams reflected back by retro-reflector 5.

Signal processing per se may be carried out in the same manner as disclosed in U.S. Pat. No. 4,055,834, mentioned above, with the same units as shown in said specification. For further illustration U.S. Pat. No. 4,055,834 is, thus, included in the present description in connection with the disclosures in said specification in connection with FIGS. 6–14, with the exception of FIG. 12, where the disclosure is only connected with what appears about signal processing from inclusive the opto-electric detector. For simplicity, the signal processing circuits in connection with the present device are only generally indicated by reference numeral 20 (see FIG. 1), since a programming unit 21 for the signal processing circuits may be provided. Communication between units 20 and 21 is via a data bus 22. Signal processing unit 20 is connected with a display and/or control panel 23 via a data bus 24. Signal connection between output 12 of detector 11 and signal processing unit 20 is via a connection 25.

What is included in light beam emitter 2, signal processing units 20, 21, 23 with associated transmissions 22, 24, and 25, as well as detector 11, light deflector unit 3, possibly with beam splitter 15 in FIG. 6, or mirror 16 in FIG. 7 is commonly designated 26 in FIGS. 3 and 4. In the concept of FIG. 4 light beam 1' is caused to sweep towards an oblique mirror 27, after which the light beam 1' is deflected in the direction of retro-reflector 5. Light beams 1' that are not screened by object 18 passing through detection area 19 will be reflected by retro-reflector as light beams 10. Unit 26 in FIGS. 3 and 4 may possibly be designed in such a manner that signal processing and controlling equipment 20, 21, and 23 is provided as a separate unit at a place remote from the apparatus diagrammatically shown in FIGS. 3 and 4. In FIG. 4 object 18, e.g. a liquid container, is introduced at A and leaves the apparatus at B. By the aid of a deflector surface 28, object 18 is introduced onto a turntable 29 and is then made to pass across detection plane 29, as indicated above, whence object 18 is guided out of the apparatus, via a guiding plate 30 and, if desired, a further conveyor (not shown) arranged outside turntable 29. It should, however, be understood that the present invention is not in any way limited to conveyance of the object along path A-B by the aid of a turntable, a concept as shown in FIG. 3 with a conveyor 31 also being feasible. The concept as shown in FIG. 4, however, permits a relatively small angle of deflection α from the light emitter 2. The path of light of beam 1' may, thus, be increased by the aid of mirror 27, resulting in less sensitivity to parallax error, i.e. sensitivity to the distance of passing between object 18 and the retro-reflector. If unit 26 is placed directly in the position of mirror 27, and the latter is removed, this will mean a larger angle α and a greater parallax error with the same height of the retro-reflector.

The above disclosure was made on the assumption that the emitted sweeping light beam 1' is a continuous light beam hitting a retro-reflector of the kind as shown in FIG. 1, i.e. with the reflecting material provided with a plurality of narrow non-reflecting stripes 6 which are provided across the sweeping direction of beam 1'. In the embodiment of FIG. 1 the reflecting material is shown as a band. It should be understood, however, that the reflecting material may have any desired dimension in the horizontal and vertical directions, and that the embodiment of FIG. 1 should, thus, not in any way be regarded as limiting the invention. As an alternative to the concept of FIG. 1 comprising reflecting material with a plurality of narrow non-reflecting stripes it is suggested according to the invention to use a retro-reflector of an untreated reflecting material, as indicated in FIG. 2 by reference numeral 32.

Figure 2:
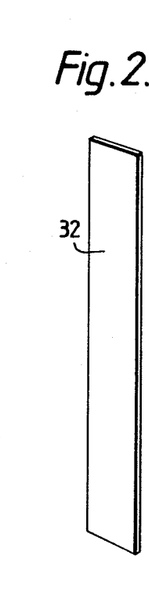
FIG. 2 illustrates a modification of the retro-reflector of FIG. 1.
Figure 2A:
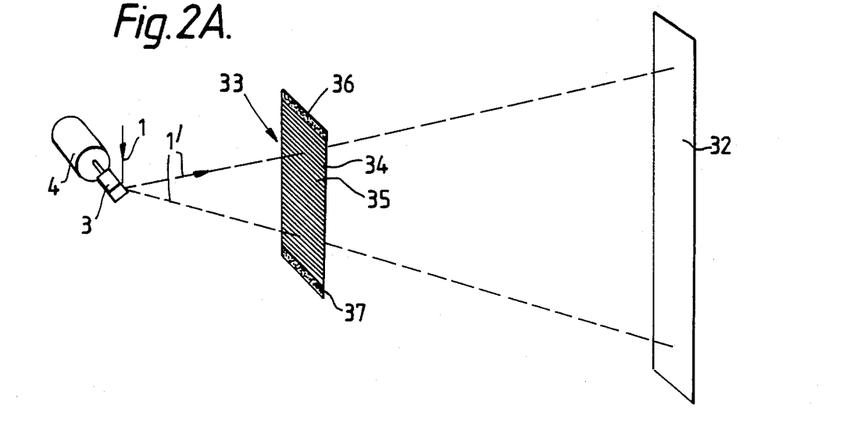
FIG. 2A shows a modification of FIG. 1, provided with retro-reflector according to FIG. 2.

If it is still desired to use a continuous light beam 1 from light emitter 2 in case of a retro-reflector of the kind as shown in FIG. 2, a transversal raster 33 (shown in dash-point-lines in FIG. 3, and in perspective in FIG. 2A) is required. Such a raster comprises alternate opaque and translucent stripes 34 and 35. Said stripes as well as blocking areas uppermost and lowermost, 36 and 39, respectively, will in fact have the same function as the specially designed retro-reflector 5 in FIG. 1. In this manner the light beams 1' hitting the retro-reflector 32 will be intermittent, and the reflected light beams (not shown) in FIG. 2A passing through raster 33 will hit detector 11 in the manner disclosed above. With a concept as shown in FIG. 2A it will, thus, be possible to use a retro-reflector 32 which does not require special treatment. Raster 33 may be formed with a resolution depending on the requirements made on detection.

With the concept shown in connection with retro-reflector 32 in FIG. 2, and with the same technical approaches as defined above in connection with FIGS. 1, 3–7, it may be advantageous to use pulsed light 1 for the sweeping light beam 1'. In such an embodiment a controllable laser diode may, e.g. be used and provided with a collimating lens. In this connection a control connection 38 (see FIG. 1) would be necessary between signal processing unit 20 and light emitter 2. Signal processing circuit 20 may, thus, determine the pulsation frequency of light beam 1. It is, however, important that the motor 4 of rotating mirror unit 3 has a stable, known velocity. This may be achieved by use of motors of a kind known per se with such properties. A further possibility in case light 1 is not pulsated is to measure the received signal strength at discrete predetermined times. In this case the same demands must be made on motor 4.

Figure 8:
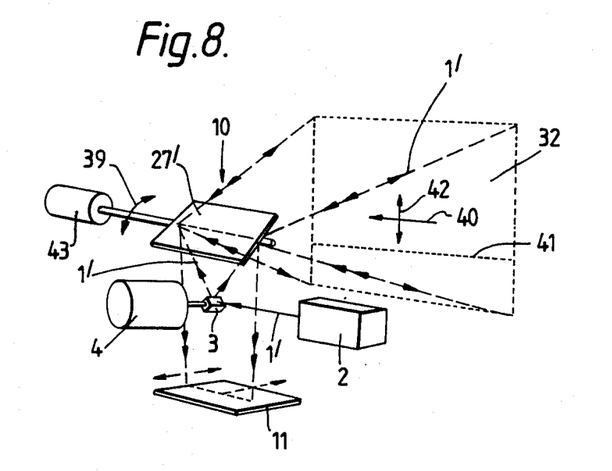
FIG. 8 shows a diagrammatic approach to cause the light beam sweep plane to move in a second plane which is normal to the sweep plane.

FIG. 8 illustrates how two-dimensional scanning may be carried out. Utilization of a pulsating light beam 1' which is deflected, as mentioned above, by light beam deflector 3, will be suitable and is indicated by a rotating mirror unit driven by a motor 4. The sweeping light beam 1' hits a mirror 27' and is deflected towards retro-reflector 32. In this connection we will make a short reference to the embodiment shown in FIG. 4 with a mirror 27 being stationary. If mirror 27 had been made movable about an axis normal to the plane of the drawing the same could be achieved as illustrated in FIG. 8. In FIG. 8 the mirror is, thus, indicated by 27' and the double arrow 39 indicates that the mirror may be tilted forwards and backwards. In the embodiment of FIG. 8 the sweeping light beam 1' will move in the direction of arrow 40, whereas tilting of mirror 27' will result in movement up and down in the direction of arrow 42 on retro-reflector 32 by the light beam appearing as a dotted line 41 on retro-reflector 32. A dotted raster is achieved in this manner on retro-reflector 32. When an object passes through the path of sweeping light beam 1', a dotted raster image of the contour of said object will, thus, be formed on retro-reflector 32, said dotted raster image being reflected back from retro-reflector 32 as beams 10 which move via mirror 27 to light detector 11. Due to the scattering angle of light beam 10 light deflecting unit 3 will, as mentioned above, have no significant screening effect in connection with detection occurring at detector 11. Further signal processing of the signals arriving from detector 11 is carried out as mentioned above in connection with the previous Figures. Obviously, the tilting rate of the motor 43 controlling mirror 27', and rotational speed of mirror unit 3 must be known to signal processing unit 20.

Figure 9:
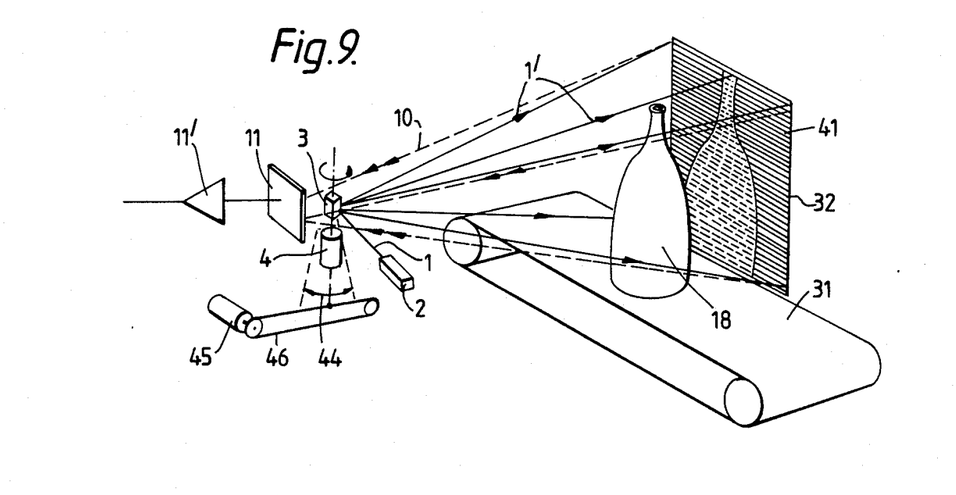
FIG. 9 shows a modification of the device of FIG. 8.

In FIG. 9 a variant of the embodiment of FIG. 8 is shown with a bottle 18 moving on a conveyor belt 31. A light beam 1 is emitted from light emitter 2, and is deflected by light deflector 3 which is driven by motor 4. A detector 11 with an associated amplifier 11' (not shown in the previous Figures) is also provided. In the concept shown in FIG. 9 the sweeping light beam 1' is caused to draw horizontal dotted lines 41 on retro-reflector 32. Instead of a tiltable mirror 27 (see FIG. 8) it is suggested to have a tiltably mounted light beam deflector, as indicated by arrow 44. When light deflector unit 3, 4 is caused to tilt, as indicated by double arrow 44, the lines 41 will be caused to tilt up and down on retro-reflector 32. Such a tilting movement may, if desired, be caused by a step motor 45 which is connected with the light deflector unit by the aid of a belt 46 and causes the latter to tilt forward and backward.

Figure 10:
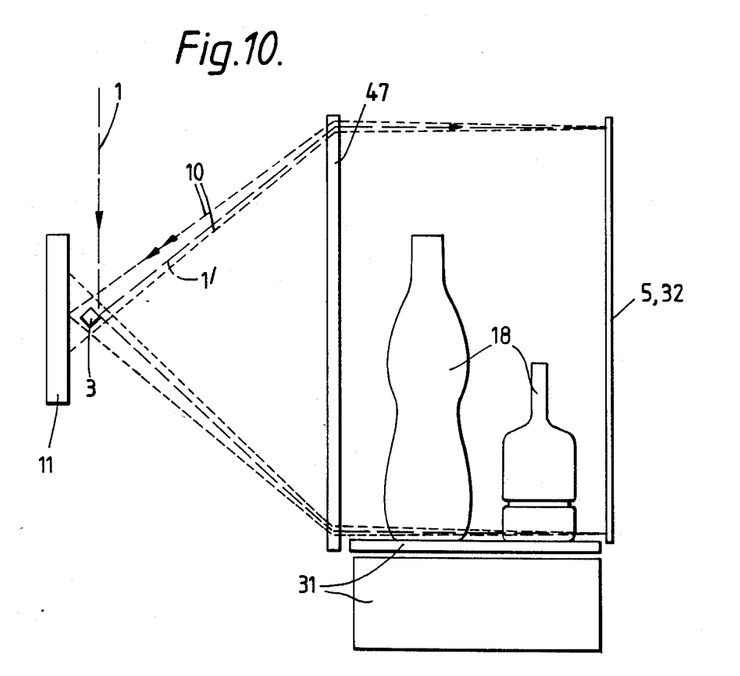
FIG. 10 shows a modification of the device of FIGS. 1 and 4 utilizing a collimating optic element causing the light beams to pass substantially in parallel across the scanning area.

In the embodiment shown in FIG. 10 the light beams are intended to pass across the detection area approximately in parallel. According to the invention it is suggested to utilize a collimating optic element 47 of a kind known per se, e.g. a holographic lens, in this case. The advantage of this concept is that complete independence is achieved of the distance of the object from retro-reflector 5; 32 (parallax-error), since light beams 10' are approximately parallel across the detection area. In the embodiment shown in FIG. 10 the same considerations as regards the previous Figures are valid, i.e. this embodiment may be used for one-dimensional or two-dimensional raster images, as in connection with FIGS. 8 and 9, and with continuous or pulsating light, dependent on the kind of retro-reflector, see FIGS. 1, 2, 2A, 3–7.

It is a considerable advantage of the present invention that the retro-reflector can be reflecting material which is a known commodity. Thus, a very inexpensive retro-reflector is provided. An advantage of the retro-reflector is that it will always reflect light in the same main direction as that in which it receives light.

An alternative to the shown and disclosed light deflecting means is utilization of a holographic deflector instead of a rotating or oscillating mirror. A light deflecting means in this context is, thus, any conceivable technical element by the aid of which the technical effect shown and disclosed may be achieved.

In connection with FIG. 10 it should be mentioned that the collimating optical element 47 may, if desired, be a common lens even though a holographic or a Fresnel lens may be most suitable. In the embodiment of FIG. 10 the parallax error that may be present in embodiments, especially as shown in FIGS. 1, 3, 8, and 9, is avoided. In order to ensure the most unambiguous detection possible it is, thus, important that the objects to be measured in accordance with what is disclosed in connection with FIGS. 1–4, 8, and 9, pass the retro-reflector at a specific distance.

Further modifications of the devices shown and described, as well as technical equivalents of them are possible within the scope of the invention, that being shown and disclosed here only to serve as an illustration of the inventive idea and not in any way to be regarded as limiting the invention.

By the present invention a comparatively expensive fiberoptic detector column and critical adjustment of the same way, thus, be avoided, and utilizing laser diodes which are controllable and have longer life than conventional gas lasers besides less expensive than the latter, the present device can be implemented at considerably lower cost than the technique disclosed in the above mentioned U.S. Pat. No. 4,055,834, issued Oct. 25, 1977.

In the present device there are only active components on one side of the conveyor, i.e. the laser, light beam deflector means with associated motor, and detector 11. Consequently, the device according to the present invention is particularly simple and inexpensive in production, and can also be made very compact. Due to the fact that said components are provided only at one side of the conveyor they are independent of vibrations. Vibrations often occur, especially in connection with a conveyor. Any minor vibrations of the retro-reflector are of no importance to the performance of the retro-reflector.

Adjustment of the present device will be simpler, first and foremost because the reflecting material to be swept across may have an arbitrary width. When the laser, light beam deflector and detector are arranged at one side of the conveyor, the requirement of a rigid frame connecting the laser and the light beam deflector means with the detector, see U.S. Pat. No. No. 4,055,834, is eliminated. The reflector will always reflect the received light beam back in exactly the same direction as it was received. The retro-reflector may be of any known kind, e.g. a socalled spheric of prismatic reflector.

Having described our invention, we claim:

1. An apparatus for obtaining a characteristic expression of an object, comprising:
   means for sweeping a light beam repeatedly in a plane which intersects the object so as to provide a sweeping light beam;
   retro-reflector means for reflecting the light beam back in said plane when the light beam is not screened by the object so as to provide a reflected light beam;
   detector means for directly receiving the reflected light beam from the retro-reflector; and
   means for transforming the reflected light beam received by said detector means into a characteristic expression of the contour of the object, said detector means being behind said sweeping means as viewed in a direction of the reflected light beam.

2. An apparatus as claimed in claim 1, wherein said sweeping means is formed so that at most only a portion of a light cone of the reflected light beam is screened by said sweeping means.

3. An apparatus as claimed in claim 1, further comprising:
   means for emitting a light beam in a continuous manner to said sweeping means; and
   a plurality of non-transparent, parallel, inter-spaced stripes between said sweeping means and said retro-reflector means.

4. An apparatus as defined in claim 1, further comprising:
   means for emitting a light beam in a continuous manner to said sweeping means; and
   a plurality of parallel, inter-spaced, non-reflective stripes across said retro-reflector means.

5. An apparatus as defined in claim 1, further comprising:
   means for emitting light beams in a pulsed manner to said sweeping means.

6. An apparatus as defined in claim 1, wherein said sweeping means includes at least one movable mirror, said mirror being rotative or oscillatory.

7. An apparatus as defined in claim 1, further comprising: a collimating optic element arranged between said sweeping means and said retro-reflector means so that the sweeping light beam passes through said collimating optic element before reaching said retro-reflector means.

8. An apparatus as defined in claim 1, further comprising:
   means for emitting a light beam within a first angle of scattering to said sweeping means, said retro-reflector means being arranged so that the reflected light beam is within a second angle of scattering which is greater than said first angle of scattering.

9. An apparatus as defined in claim 1, wherein said transforming means includes means for transforming the reflected light beam opto-electronically into electric signals indicative of incremental portions of a raster image of the object and further including means for processing said electric signals into the characteristic expression of the contour of the object.

10. An apparatus as defined in claim 1, further comprising:
    means for splitting said sweeping light beam into a plurality of light beams which are reflected by said retro-reflector means.

11. An apparatus as defined in claim 1, wherein said sweeping means includes holographic deflector means.

12. An apparatus as defined in claim 1, further comprising:
    a mirror for changing a direction of radiation of the sweeping light beam and the reflected light beam, said mirror being arranged between said sweeping means and said retro-reflector means.

13. An apparatus as defined in claim 11, wherein said holographic deflector means includes a rotatable holographic plate.

14. An apparatus as defined in claim 12, wherein said mirror is stationary and oblique.

15. An apparatus as defined in claim 12, wherein said mirror is arranged to oscillate for forming a two-dimensional raster image of dots of lights on said retro-reflector means.

16. An apparatus as defined in claim 12, wherein said sweeping means is formed to pass the sweeping light beam through a deflection plane, further comprising:
    means for rotating said mirror about an axis to form a two-dimensional raster image of dots of light on said retro-reflector, said sweeping means including means for effecting a reciprocating movement of said mirror along said axis forwards and backwards in a plane orthogonal to the deflection plane.

17. An apparatus for obtaining a characteristic expression of an object, comprising:
    means for sweeping a light beam repeatedly in a plane which intersects the object;
    retro-reflector means for reflecting the light beam which is not screened by the object back in said plane to provide a reflected light beam;
    detector means for directly receiving the reflected light beam from the retro-reflector;
    means for transforming the reflected light beam received by said detector means into a characteristic expression of the contour of the object; and
    means for deflecting the reflected light beam at a predetermined angle towards said detector means and for allowing the sweeping light beam to pass through said deflecting means unobstructed to said retro-reflector means.

18. An apparatus as defined in claim 17, further comprising:
   means for emitting a light beam in a continuous manner to said sweeping means.

19. An apparatus as defined in claim 17, further comprising:
   means for emitting light beams in a pulsed manner to said sweeping means.

20. An apparatus as defined in claim 17, wherein said sweeping means includes at least one movable mirror, said mirror being rotative or oscillatory.

21. An apparatus as defined in claim 17, further comprising:
   a collimating optic element arranged between said sweeping means and said retro-reflector means so that the sweeping light beam passes through said collimating optic element before reaching said retro-reflector means.

22. An apparatus as defined in claim 17, further comprising:
   means for emitting a light beam within a first angle of scattering to said sweeping means, said retro-reflector means being arranged so that the reflected light beam is within a second angle of scattering which is greater than said first angle of scattering.

23. An apparatus as defined in claim 17, wherein said transforming means includes means for transforming the reflected light beam opto-electronically into electric signals indicative of incremental portions of a raster image of the object and further including means for processing said electric signals into the characteristic expression of the contour of the object.

24. An apparatus as defined in claim 17, further comprising:
   means for splitting the sweeping beam up into a plurality of light beams which are reflected by said retro-reflector means.

25. An apparatus as defined in claim 17, wherein said deflecting means includes a mirror means.

26. An apparatus as defined in claim 17, wherein said sweeping means includes holographic deflector means.

27. An apparatus as defined in claim 17, further comprising:
   a mirror for changing a direction of radiation of the sweeping light beam and the reflected light beam, said mirror being arranged between said sweeping means and said retro-reflector means.

28. An apparatus as defined in claim 25, wherein said mirror means includes an oblique mirror in a path of radiation of the sweeping light beam, said mirror having a slot for allowing the reflected light beam to pass unobstructed through said mirror to said retro-reflector means.

29. An apparatus as defined in claim 26, wherein said holographic deflector means includes a rotatable holographic plate.

30. An apparatus as defined in claim 27, wherein said mirror is stationary and oblique.

31. An apparatus as defined in claim 27, wherein the sweeping light beam passes through a deflection plane, further comprising:
   means for rotating said mirror about an axis to form a two-dimensional raster image of dots of light on said retro-reflector, said sweeping means including means for effecting a reciprocating movement of said mirror along said axis forwards and backwards in a plane orthogonal to the deflection plane.

32. An apparatus as defined in claim 27, wherein said mirror is arranged to oscillate for forming a two-dimensional raster image of dots of lights on said retro-reflector means.

33. An apparatus for obtaining a characteristic expression of an object, comprising:
   means for emitting light beams in a pulsed manner;
   means for sweeping the light beams repeatedly in a plane which intersects the object;
   retro-reflector means for reflecting the light beam back in said plane when the light beams are not screened by the object to provide reflected light beams; and
   detector means for directly receiving the light beam from the retro-reflector, and transforming the reflected light beams into signals indicative of incremental portions of a raster image of the object and for processing the signals into a characteristic expression of the contour of the object.

34. An apparatus as defined in claim 33, further comprising:
   mirror means for deflecting the reflected light beams to said detector means and to enable the sweeping light beams to pass unobstructed to said retro-reflector means.

35. An apparatus as defined in claim 33, wherein said mirror means includes an oblique mirror in a path of radiation of the sweeping light beams, said mirror having a slot for allowing the reflected light beams to pass unobstructed through said mirror to said retro-reflector means.

36. An apparatus as defined in claim 33, wherein said sweeping means includes at least one movable mirror, said mirror being rotative or oscillatory.

37. An apparatus as defined in claim 33, further comprising:
   a collimating optic element arranged between said sweeping means and said retro-reflector means so that the sweeping light beams pass through said collimating optic element before reaching said retro-reflector means.

38. An apparatus as defined in claim 33, further comprising:
   means for emitting light beams within a first angle of scattering to said sweeping means, said retro-reflector means being arranged so that the reflected light beams are within a second angle of scattering which is greater than said first angle of scattering.

39. An apparatus as defined in claim 33, wherein said transforming means includes means for transforming the reflected light beams opto-electronically into electric signals indicative of incremental portions of a raster image of the object and further including means for processing said electric signals into the characteristic expression of the contour of the object.

40. An apparatus as defined in claim 33, further comprising:
   means for splitting each of the sweeping light beams up into a plurality of light beams which are reflected by said retro-reflector means.

41. An apparatus as defined in claim 33, wherein said sweeping means includes holographic deflector means.

42. An apparatus as defined in claim 33, further comprising:
   a mirror for changing a direction of radiation of the sweeping light beams and the reflected light beams, said mirror being arranged between said sweeping means and said retro-reflector means.

43. An apparatus as defined in claim 41, wherein said holographic deflector means includes a rotatable holographic plate.

44. An apparatus as defined in claim 42, wherein said mirror is stationary and oblique.

45. An apparatus as defined in claim 42, wherein said mirror is arranged to oscillate for forming a two-dimensional raster image of dots of lights on said retro-reflector means.

46. An apparatus as defined in claim 42, wherein said sweeping means is formed to pass the light beams through a deflection plane, further comprising:
  means for rotating said mirror about an axis to form a two-dimensional raster image of dots of light on said retro-reflector, said sweeping means including means for effecting a reciprocating movement of said mirror along said axis forwards and backwards in a plane orthogonal to the deflection plane.

* * * * *

UNITED STATES PATENT AND TRADEMARK OFFICE
CERTIFICATE OF CORRECTION

PATENT NO. : 4,859,862

DATED : August 22, 1989

INVENTOR(S) : Tore Planke, Andreas Nordbryhn, Steinar Solnordal

It is certified that error appears in the above-identified patent and that said Letters Patent is hereby corrected as shown below:

On the title page, in the ABSTRACT, line 6, change "guilded" to --guided--.

Fig. 3 should be deleted to be replaced with Fig. 3 as shown below:

UNITED STATES PATENT AND TRADEMARK OFFICE
CERTIFICATE OF CORRECTION

PATENT NO. : 4,859,862

DATED : August 22, 1989

INVENTOR(S) : Tore Planke, Andreas Nordbryhn, Steinar Solnordal

It is certified that error appears in the above-identified patent and that said Letters Patent is hereby corrected as shown below:

Fig. 4 should be deleted to be replaced with Fig. 4 as shown below:

Signed and Sealed this

Twenty-first Day of August, 1990

Attest:

HARRY F. MANBECK, JR.

Attesting Officer

Commissioner of Patents and Trademarks